United States Patent [19]

Wiley

[11] Patent Number: 4,516,612
[45] Date of Patent: May 14, 1985

[54] MULTIPURPOSE TABLE SAW

[76] Inventor: Edward R. Wiley, 9050 - 51st Pl., Mercer Island, Wash. 98040

[21] Appl. No.: 414,907

[22] Filed: Sep. 3, 1982

[51] Int. Cl.³ .................. B23D 19/00; B27B 31/00; B25H 1/00; B27C 9/00
[52] U.S. Cl. .................. 144/1 R; 83/102.1; 83/477.2; 83/438; 144/134 R; 144/286 R; 144/253 R; 144/253 J
[58] Field of Search ........... 144/1 R, 3 R, 286 R, 144/1 E, 1 F, 134 R, 253 R, 253 J; 83/477.2, 477.1, 438, 574, 102.1

[56] References Cited

U.S. PATENT DOCUMENTS

| | | |
|---|---|---|
| 7,871 | 9/1877 | Nichols . |
| 15,368 | 7/1856 | Bronghton . |
| 23,070 | 3/1859 | Battin . |
| 529,839 | 11/1894 | Robinson . |
| 933,688 | 9/1909 | Atwood . |
| 1,359,394 | 11/1920 | Leaver, Jr. . |
| 2,064,607 | 12/1936 | Hirtz, Sr. . |
| 2,247,314 | 6/1941 | Sellmeyer . |
| 2,273,715 | 2/1942 | Lonskey et al. . |
| 2,786,497 | 3/1957 | Brucker . |
| 3,013,592 | 12/1961 | Ambrosio et al. . |
| 3,734,151 | 5/1973 | Skripsky ...................... 144/1 R |

Primary Examiner—W. D. Bray

[57] ABSTRACT

The saw includes a sectional table top made up of one or more sections that may be opened to receive insertable conversion assemblies adapted to provide additional woodworking functions. A rotary saw blade is moveable reciprocatively with respect to the table top at selected angles of tilt and at selected heights. One or two rip fences are selectively positionable in parallel alignment with the rotary saw blade, and may be lowered to form lateral extensions of the table top. The table top includes dovetail grooves to receive attachment for a work piece clamp or an angle guide. A kerf guide is attachable to the rear edge of the table top.

30 Claims, 16 Drawing Figures

MULTIPURPOSE TABLE SAW

BACKGROUND OF THE INVENTION

This invention relates to table saws and, more particularly, to multipurpose table saws capable of performing multiple woodworking functions.

Multipurpose table saws of this type typically include a single motor-transmission unit which is used to drive multiple interchangeable tools. The motor-transmission unit, however, tends to be complex and hence costly because it must be capable of driving the tools at various speeds, depending upon the woodworking function to be performed by the tool used. Another drawback of these and other types of table saws is that it is necessary to move and install the rip fence when converting the saw from one woodworking function to another, or when alternating between rip and cross cuts. This not only is inconvenient for the operator, but also requires repeated measurement in order to ensure proper positioning of the rip fence or fences with respect to the rotary cutting blade.

SUMMARY OF THE INVENTION

This invention provides a multipurpose woodworking system capable of providing wood sawing functions commonly associated with radial arm, power miter, table saws and other types of saws, together with other woodworking functions such as routing, wood turning, scroll sawing, sanding and drilling. This invention, however, is not limited to these woodworking functions, and may be converted to provide other woodworking functions. According to this invention, one, two or more individually powered conversion assemblies, each including a drive motor and an appropriate power tool for providing the woodworking function desired, may be added to or substituted for the rotary saw blade provided by a conventional table saw. One presently preferred embodiment of this invention provides a sectional table top which may be opened to receive, and then may be closed upon to secure, each conversion assembly.

According to further aspects of one presently preferred embodiment of the invention, a rotary saw blade is movable with respect to the table top so that the blade can be drawn or passed through a work piece clamped to the table top at a controlled depth and angle of cut. The blade is tiltable on a center of rotation which coincides with the surface of the table top so that the position of the cut obtained remains predictable and fixed regardless of the height or angular position of the blade. The blade also may be raised or lowered at any angle of tilt, thus enabling the system to make perpendicular or angle cuts in work pieces of varying thicknesses. While it is preferred to provide a movable rotary saw blade, however, the blade may be in a fixed position with respect to the table top, requiring the work piece to be moved past the blade to effect a cut. In this case, the rotary saw blade could be supported by the table base, chassis, table top or other permanent structure, or could be incorporated in a removable conversion assembly such as that mentioned above.

According to still further aspects of one presently preferred embodiment of this invention, one or two parallel rip fences are supported by the table top sections and are movable bidirectionally in parallel alignment with the rotary saw blade so as to be adjustable in accordance with the width of the work piece. One or both of the rip fences may be swung from an upright position to a lowered position flush with the table top to form one or two lateral extensions to the table top. The preferred table top includes one, two or more undercut grooves which intersect one another at right angles. These grooves are adapted to cooperate with and retain a work piece clamp, or an angle guide, or both. A kerf guide is attachable to the rear edge of the table top.

Thus, as will be apparent from the foregoing summary, this invention provides a woodworking system which overcomes or substantially mitigates the problems associated with prior multipurpose woodworking systems. With this invention, modern high efficiency electric motors may be employed as individual power sources for interchangeable conversion assemblies capable of providing selected woodworking functions. Additionally, the system may be converted between multiple woodworking functions, and between cross cut and rip cut set ups, rapidly and with minimal or no adjustment. This invention therefore possesses or offers versatility, economies, and efficiencies which surpass prior woodworking systems.

These and other features, objects and advantages of the present invention will become apparent from the detailed description and claims to follow, taken in conjunction with the accompanying drawings in which like parts bear like reference numerals.

DETAILED DESCRIPTION OF THE DRAWINGS

Figure 1:
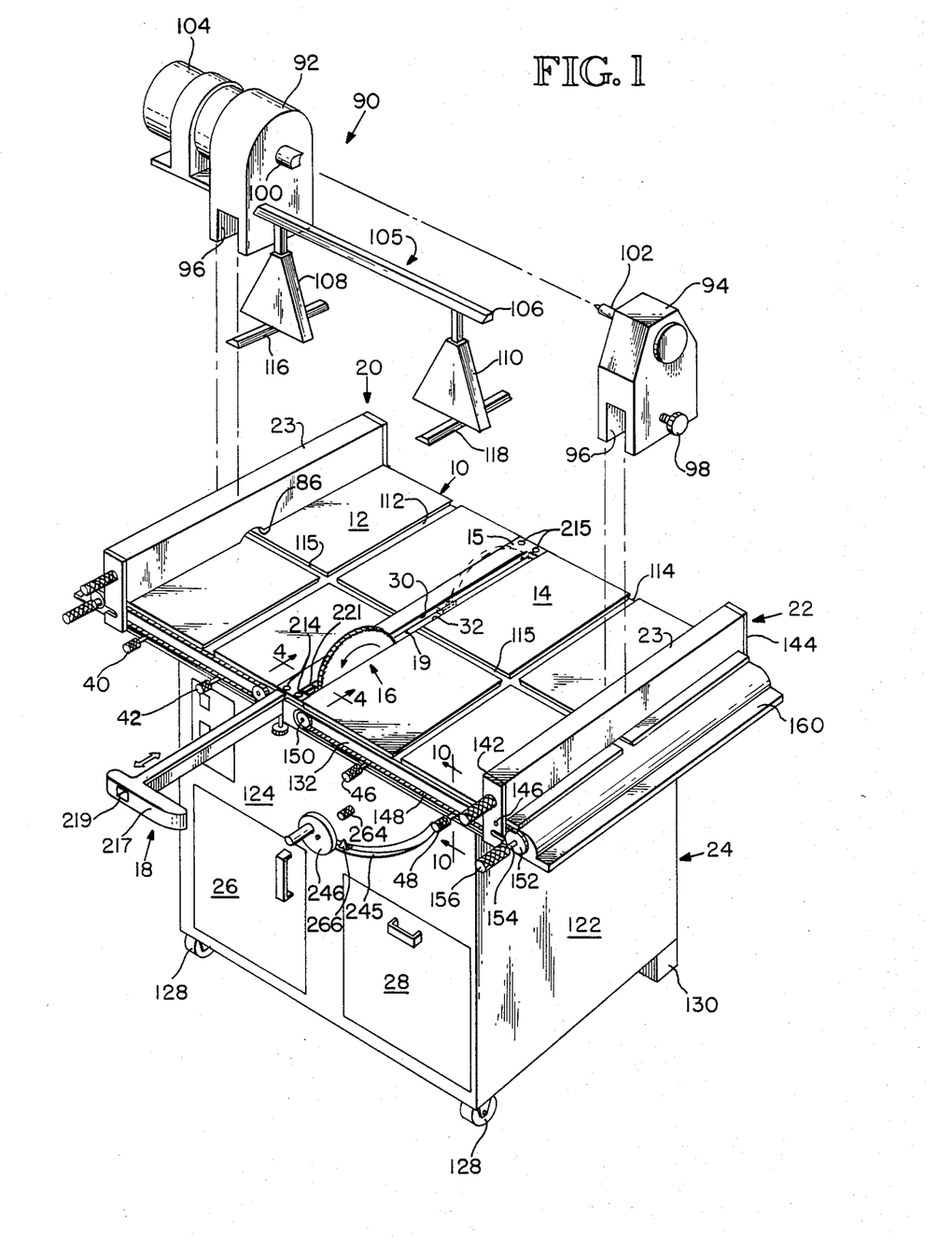
FIG. 1 is a perspective view of the multipurpose woodworking system according to this invention, depicting the rotary saw blade in solid lines in its forward position and in phantom lines in its rear position, together with a conversion assembly for converting the system into a lathe.
Figure 2:
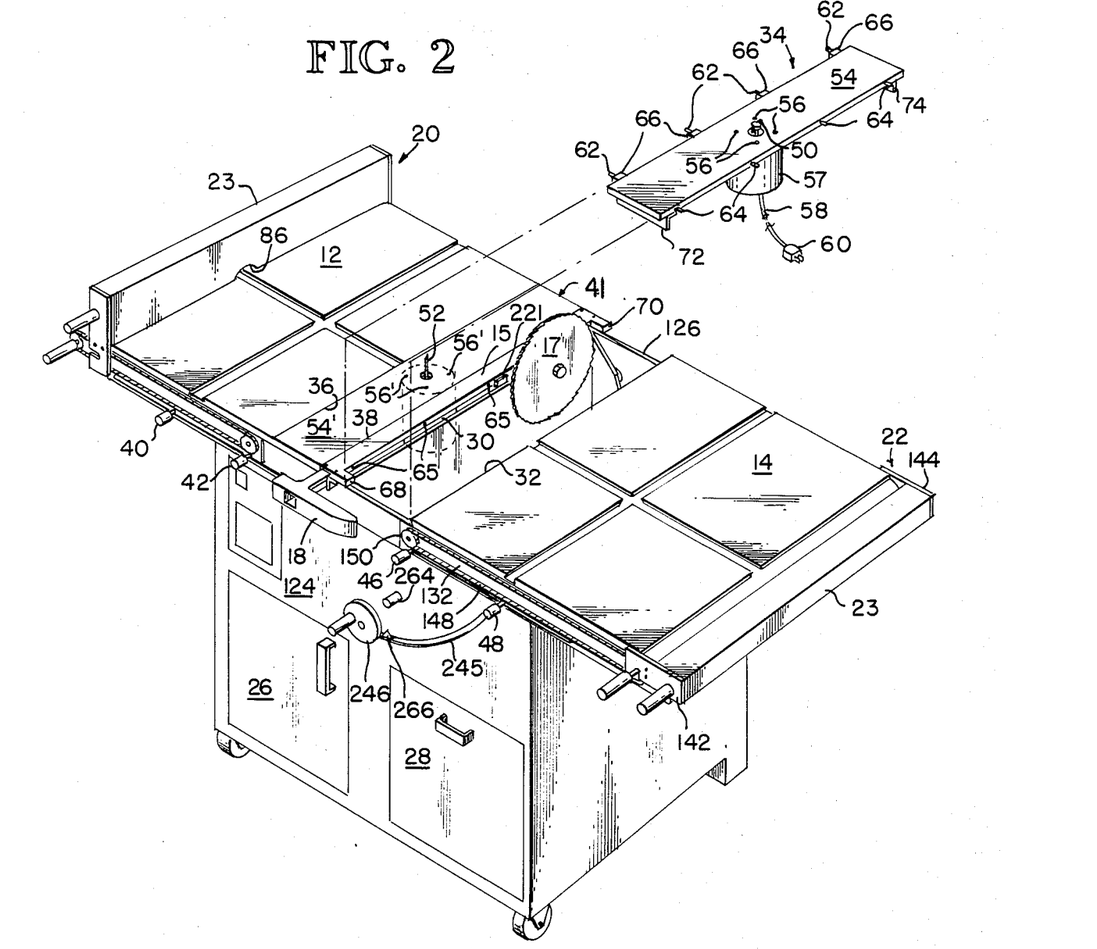
FIG. 2 is a perspective view generally similar to FIG. 1, depicting one table top section in its open position ready to receive a router conversion assembly and the other table top section in its closed position securing a jigsaw/saber saw conversion assembly.
Figure 3:
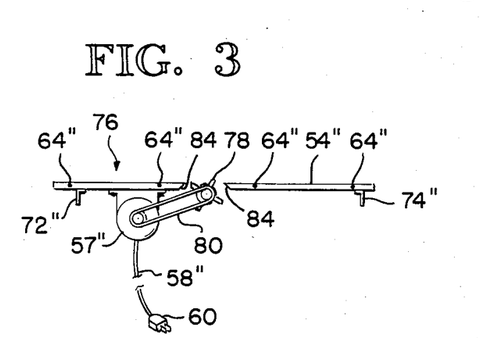
FIG. 3 is a longitudinal section of a planner/jointer conversion assembly.

Referring to FIGS. 1–3, of the drawings, one presently preferred embodiment of the multipurpose woodworking system according to this invention includes a sectional table top 10 made up of movable top sections 12 and 14 and a fixed center section 15 located intermediate sections 12 and 14 adjacent a saw assembly (generally referenced 16). As most clearly illustrated in FIG. 2, table top 10 may be opened by moving one or both top sections laterally to a position spaced from blade 17. A conversion assembly is insertable into the space so formed to convert the system to another woodworking function as will be described presently.

The saw assembly 16 includes a rotary saw blade 17 which is movable reciprocatively, as indicated by the arrow in FIG. 1, by an operator handle 18 along a rectilinear path within a slot 19 formed between edge 30 of section 15 and edge 32 of section 14. Blade 17 is movable between a forward position in which it is depicted in solid lines and a rear position in which it is depicted in phantom lines. The angle of tilt or inclination of blade 17, or the height of blade 17, or both, may be adjusted to control the angle or depth of cut, as will be described presently.

Two spaced apart parallel rip fence assemblies 20 and 22 are supported by the table top, and are movable toward and away from each other in parallel alignment with blade 17 so as to adjust the lateral spacing therebetween to accommodate work pieces of different widths. Each rip fence assembly includes an elongated fence member 23 which is rotatable between an upright position illustrated in FIG. 1, and lowered position illustrated in FIG. 2. In the lowered position, each fence member serves to enlarge or provide a lateral extension of the top working surface of the table top 10, as will be described presently.

A base (generally referenced 24) supports the table top 10 and saw assembly 16, together with any conversion assembly that may be used. The base also houses appropriate controls and power connectors for operating and controlling the saw assembly and conversion assemblies. In the example, base 24 also provides a cabinet which includes two doors 26 and 28 that may be opened to provide storage for tools, attachments and similar hardware.

THE CONVERSION ASSEMBLIES

Referring in particular to FIGS. 2 and 3, the system may be converted from one woodworking function to another simply by moving one of the top sections 12 or 14 to its laterally retracted position, forming a space adjacent blade 17 for receiving a conversion assembly according to this invention. After insertion of the conversion assembly into this space, the top section may serve to secure the conversion assembly to the base. To prepare the system for use of a conversion assembly, blade 17 is locked in its rear position by a friction lock 223 (to be described presently), and then is lowered until its cutting edge is flush with or slightly below the upper surface of table top 10. The manner in which blade 17 is lowered will be described presently.

In the example illustrated in FIG. 2, section 14 is located in its laterally retracted position. The space between edge 30 of top section 15 and opposed edge 32 of section 14 is of a width sufficient to receive conversion assembly 34, in this case to provide a router function. Section 12 also is illustrated laterally retracted, but it has been pushed slightly toward blade 17 so that its edge 36 and opposed edge 38 of section 15 are in contact, respectively, with the longitudinal edges of another conversion assembly 41, in this case providing a saber saw or jigsaw function.

Friction locks 40 and 42 secure and maintain section 12 in position once it is pushed against assembly 41. Consequently, assembly 41 may be clamped between section 15 and section 12 in order to positively secure it to the base. This of course restrains assembly 41 against any lateral shifting during use. (Additional restraints against vertical, forward and rearward shifting also are provided, as will be described presently.) Similar locks 46 and 48 are provided to secure and maintain section 14 in a like manner following insertion of assembly 34. Details of locks 40, 42, 46 and 48 will be described presently.

The conversion assemblies 34 and 41 are generally similar, except that assembly 34 supports a router tool 50 and assembly 41 supports a saber or jigsaw tool 52. Referring in particular to FIG. 2, assembly 34 includes an elongated panel 54 which corresponds in length to the widths of sections 12 and 14, and which is of a thickness corresponding to the thickness of sections 12 and 14. Four flush-head mounting screws 56 are connected to and mount an electric motor 57 beneath panel 54. Motor 57 is coupled to and drives tool 50. Appropriate electrical leads 58 and a power connector 60 adapted for connection to an electrical connector (not shown) mounted underneath top 10 are connected to motor 57 to supply it with electrical power.

To insert and position panel 54 in the table top receiving space (FIG. 2), panel 54 is supported at its ends between the front and rear walls 124 and 126 of base 24. When inserted in the space formed between edges 30 and 32, its upper surface will be in coplanar alignment with the upper surfaces of sections 12, 14 and 15, thereby providing a composite work support surface of uniformly planar contour. To position panel 54 with respect to blade 17 and section 14, assembly 34 further includes two sets of pegs 62 and 64 which project laterally from the longitudinal edges of panel 54. These pegs are insertable, respectively, into receiving holes 65 formed in edges 30 and 32. (Holes 65 in edge 32 are not shown.) Spacers 66 are located with pegs 62 and are engageable with edge 30 in order to space panel 54 from edge 30 a distance sufficient to provide adequate clearance for blade 17. Section 15 includes end portions 68 and 70 of widths corresponding to the widths of spacers 66 for engaging and positioning the ends of panel 54 correspondingly.

As will now be appreciated, pegs 62 and 64 when inserted in holes 65, provide additional restraint for panel 54 and hence assembly 34 against forward, rearward and vertical shifting. In the example, two L brackets 72 and 74 are mounted by the ends of panel 54 at a spacing sufficient to fit within base 24 between walls 124 and 126 at close clearance. Consequently, brackets 72 and 74 provide additional forward and rearward stability to panel 54, and facilitate initial positioning of panel within the space provided.

Assembly 41, as illustrated in FIG. 2, is generally similar to assembly 34, and parts corresponding to those of assembly 34 already described are designated by the same reference numerals, primed. Assembly 41, however, is adapted to be inserted into the opposite receiving space; namely, that formed between edges 36 and 38 when section 12 is retracted laterally. As a consequence, peg spacers such as spacers 66 are not required since clearance for blade 17 need not be provided.

Referring to FIG. 3, another conversion assembly (generally referenced 76) providing planner/jointer functions is insertable into the space between edges 36 and 38 and may be substituted for assembly 41. Assembly 76 is generally similar to assemblies 34 and 41, and parts corresponding to those already described are designated by the same reference numerals, double primed. Unlike assemblies 34 and 41, however, electric motor 57" is connected to and drives a rotary cutting blade 78 by an endless belt 80. Panel 54" includes an opening formed between arcuate relief surfaces 84 for exposing blade 78 to a work piece. The rip fence member 23 of assembly 20 includes a relief surface 86 which forms a recess of sufficient height to provide clearance for blade 78 so that assembly 20 may be positioned adjacent assembly 76 with member 23 proximate blade 78 to perform planner/jointer functions. The manner in which assembly 20 is moved to that position will be described presently.

Still another conversion assembly (generally referenced 90) is depicted in FIG. 1 for providing a lathe function. Unlike assemblies 34, 41 and 76, however, assembly 90 is supportable between the rip fence members 23 of assemblies 20 and 22, and overlies table 10. Assembly 90 includes a headstock 92 and a tailstock 94, each of which includes an inverted U-shaped channel 96 having a cross-sectional outline registerable with the cross-sectional profiles of members 23. Headstock 92 and tailstock 94, therefore, may be supported by placing channels 96 over members 23, when in their upright positions illustrated. Friction locks 98 are threaded through the headstock and tailstock (headstock lock not shown) for engagement with members 23. Locks 98 then may be screwed against members 23 to secure headstock 92 and tailstock 94 in that position. These locks operate in a manner generally similar to that of locks 40, 42, 46 and 48. Headstock 92 and tailstock 94 rotatively support conventional lathe chucks 100 and 102 which are engageable with the ends of a work piece. As in the case of assemblies 34, 41 and 76, assembly 90 includes an individual power source which, in the example, is constituted by an appropriate electric motor 104.

A support rest 105 for wood turning tools (not shown) may be used in conjunction with assembly 90, and includes an elongated member 106 supported adjacent its ends by two legs 108 and 110. The legs are attachable within spaced apart parallel grooves 112 and 114 formed in table top 10. In the example, these grooves are undercut and preferably are of a dovetail cross-sectional outline. Legs 108 and 110 mount keys 116 and 118 having cross-sectional profiles which register with the cross-sectional outlines of grooves 112 and 114. Keys 116 and 118 are insertable into the forward or rear ends of grooves 112 and 114, along which they are slidable in a forward or rearward direction until reaching a selected location for rest 105 to provide support for the wood turning tool to be used. Table top 10 additionally includes groove 115 which is perpendicular to grooves 112 and 114, but is of the same dovetail cross-sectional outline. This groove, together with grooves 112 and 114, may be used with the attachable clamp and angle guide of this invention, both to be described presently.

Sections 12 and 14 could be sectionalized to form removable panels adjacent blade 17. Such would be identical to panels 54 and 54', respectively, so that they could be supported and retained in the same manner when the conversion assemblies are not in use. The panel which fronts upon blade 17 opposite edge 30, however, would not include pegs or spacers such as 62 or 66 in order to form slot 19 along which blade 17 may be moved to effect a cut, but would be positioned parallel to and spaced from edge 30 by portions 68 and 70 in the same manner as panel 54.

THE TABLE TOP AND BASE

Referring now to FIGS. 1, 2, 5 and 10 base 24 includes two side walls 120 and 122, a front wall 124, and a rear wall 126. Base 24 is supported by two wheels 128 located adjacent its front corners and two legs 130 (one not shown) underlying its rear corners. The table top sections 12 and 14 rest upon the upper edges of walls 120, 122, 124 and 126 and are slidable laterally thereon in order to convert the system to selected woodworking functions, as mentioned above. As most clearly illustrated in FIGS. 5 and 10, the front edge portion of section 14 rests upon the upper edge of front wall 124. A downwardly projecting angle member 132 is secured to and extends along the front edge of section 14, and terminates in an upturned lip portion 134 which contacts the exterior surface of front wall 124. A similar angle member 133 is secured to and extends along the rear edge of section 14, and terminates in an oppositely upturned lip portion (not shown) which similarly contacts the exterior surface of rear wall 126. The opposed lip portions are so spaced that they serve to restrain section 14 against forward and rearward movement, or movement parallel to the direction of saw blade movement, but guide section 14 for lateral movement, as mentioned above. Section 12 includes identical angle members 136 and 137 which similarly restrain and guide it for lateral movement corresponding to that of section 14. While sections 12 and 14 slide with respect to the upper edges of walls 124 and 126, appropriate rollers, bearings or other means for promoting low friction movement could be interposed between those edges and sections 12 and 14.

Figures 6, 7, 10:
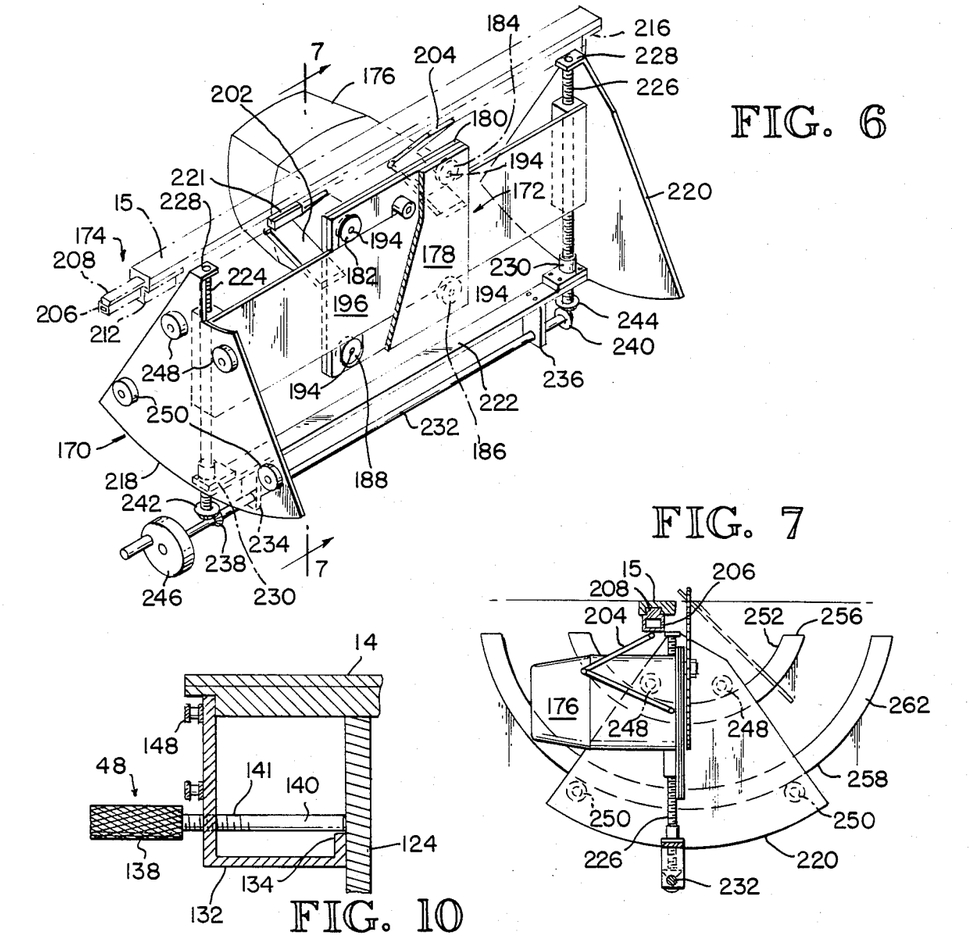
FIG. 6 is a perspective view of the saw assembly of the FIG. 1 system.
FIG. 7 is a section taken along the line 7—7 in FIG. 6.
FIG. 10 is a section taken along the line 10—10 in FIG. 1.
Figure 8:
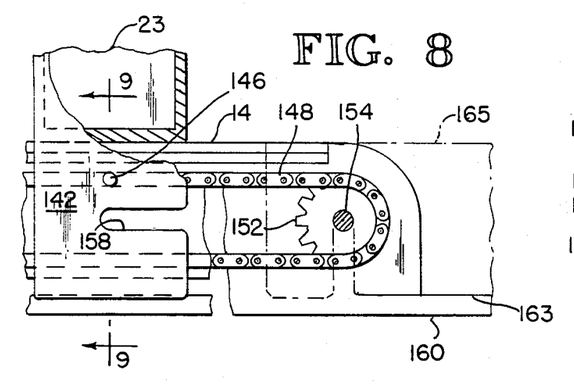
FIG. 8 is a fragmentary side elevation of one rip fence assembly of the FIG. 1 system.
Figure 9:
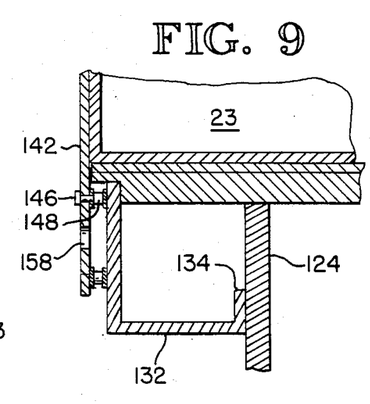
FIG. 9 is a section taken along the line 9—9 in FIG. 8.

Referring to FIG. 10, friction lock 48 projects through and is threaded exteriorly to member 132. Lock 48 includes an exterior knob 138 and a shaft 140 which projects through member 132 with its end adjacent the exterior of wall 124. The exterior of shaft 140 is threaded at 141 through member 132. By turning knob 138 in one direction, the end of shaft 140 may be extended into frictional engagement with wall 124 to thereby lock or secure section 14. As will now be appreciated, member 133 prevents section 14 from shifting forwardly as shaft 140 engages wall 124. Conversely, by turning knob 138 in the opposite direction, the end of shaft 140 may be retracted to release section 14. Friction locks 40, 42 and 46 are identical to lock 48 and will not be described.

THE RIP FENCE ASSEMBLIES

Rip fence assembly 22 will now be described with reference to FIGS. 1, 2, 5, and 8-10. Rip fence assembly 22 is made up of two arms 142 and 144, which are secured to the ends of and support fence number 23, in the example a box beam of rectangular cross section. Arms 142 and 144 are connected pivotally by pins 146 (FIGS. 8 and 9) to endless chains 148 which are supported, respectively, between inboard and outboard pairs of sprocket gears 150 and 152. These gears are spaced apart adjacent the inboard and outboard edges of section 14 so that chains 148 extend along parallel runs which coincide with the front and rear edges of section 14. Gears 150 are supported rotatively by the inboard ends of members 132 and 133. Gears 152 are secured to the end portions of a common shaft 154 which, in turn, is supported rotatively by the outboard edges of members 132 and 133. A knob 156 is attached to the front end of shaft 154 for rotating it and hence gear 152. In the upright position illustrated in FIG. 1, the arms 142 and 144 support member 23 with its lower edge at close clearance to the upper surface of section 14. In the lowered position illustrated in FIG. 2, arms 142 and 144 support member 23 so that it rests upon a flange 160 which protects laterally from the outboard end of section 14.

Since shaft 154 is connected to both gears 152, the two chains 148 can be rotated in unison in response to rotation imparted to shaft 154 by knob 156. Further, by locating pins 146 at corresponding locations along the chain runs, fence member 23 may be moved laterally toward and away from blade 17, while remaining in parallel alignment with blade 17. Consequently, as the chains 148 rotate in unison, member 23 will be maintained in such parallel alignment. To secure the rip fence assembly at a selected upright position spaced from blade 17, a lock shaft 155 extends between both arms 142 and 144. This shaft is threaded to arm 144 such that it may be turned into arm 144 so as to urge arms 142 and 144 together and into gripping engagement with the front and rear edges of section 14.

At the outboard-most position of rip fence assembly 22, fence member 23 may be swung downwardly from the upright position illustrated in FIG. 1 to a lowered position illustrated in FIG. 2. To this end, as most clearly illustrated in FIG. 8, an elongated slot 158 is formed in the lower end portion of arm 142 in horizontal alignment with shaft 154. As the rip fence assembly is moved toward its outboard-most position, this slot will engage with shaft 154, which acts as a pivot point about which arm 142 will rotate in an outward-downward direction toward the lowered position illustrated. At this position, the outboard face 163 of fence member 23 rests upon and is supported by flange 160 and its inboard face is generally coplanar with the upper surface of section 14. Arm 144 includes a slot 161 (FIG. 5) identical to slot 158 and is pivotable correspondingly.

The other rip fence assembly 20 is similarly mounted and is movable in the same manner, both laterally and rotatively. Parts associated with assembly 20 that correspond to those just described are designated with the same reference numerals, primed. Thus, it is possible, by adjusting the lateral spacing between the rip fence assemblies 20 and 22 when in their upright positions, to allow the system to accept work pieces of different widths. Alternatively, by lowering one or both of the rip fence assemblies to the FIG. 2 positions, it is possible to enlarge the effective surface area of one or both sections 12 and 14 in order to handle work pieces of greater surface area or to make cross cuts.

THE SAW ASSEMBLY

Referring now to FIGS. 4–7, the saw assembly 16 is made up of a cradle (generally referenced 170), a carriage (generally referenced 172) supported by the cradle for rectilinear movement, and an operator handle (generally referenced 18) for moving and positioning carriage 172 and hence blade 17. The carriage 172 supports an appropriate electric motor 176 for driving blade 17 rotatively about an axis of rotation transverse to the direction of cut. Carriage 172 includes two spaced apart, opposed side plates 178 and 180, and four rollers 182, 184, 186 and 188 supported between plates 178 and 180 adjacent to the corners thereof. Upper and lower spacers 190 and 192 maintain plates 178 and 180 spaced apart to form an intervening channel of rectangular cross-sectional outline. Plates 178 and 180, and spacers 190 and 192, are held together by bolts 194 which extend coaxially through rollers 182-188, as shown (FIG. 6). Cradle 170 includes a rail 196 which extends through the channel formed between plates 178 and 180 with its upper edge 198 in underlying contact with rollers 182, 184 and its lower edge 200 in overlying contact with rollers 186, 188. Carriage 172 therefore is movable reciprocatively along rail 196.

The operator handle 18 is connected to carriage 172 by two hinged connectors 202 and 204 for moving and positioning carriage 172 along rail 196. As most clearly shown in FIG. 4, handle 18 includes an elongated tubular member 206 of square cross section, and an elongated dovetail slide 208 extending along the upper side of member 206. Slide 208 is inserted into and movable reciprocatively within an undercut groove 210 formed along the underside of member 15, in order to support and guide member 206 for corresponding movement. Connectors 202 and 204 are connected by hinges 211 to member 206 and plate 180. These hinges, together with intermediate hinges 213, are hinged about swing axes which are parallel to slot 19. An inverted hat-shaped bracket 212 is mounted by the front wall 124 to provide underlying support to member 206, and acts as the mount to which the front end of section 15 is secured by two flush head screws 214 (FIG. 1). A friction lock 223 (FIG. 5) generally similar to locks 40, 42, 46 and 48 is threaded through bracket 212 for securing member and hence blade 17 in a selected position. The rear end of section 15 is secured by flush-head screws 215 to an L-bracket 216 mounted by the rear wall 126, as shown (FIG. 5).

Figure 4:
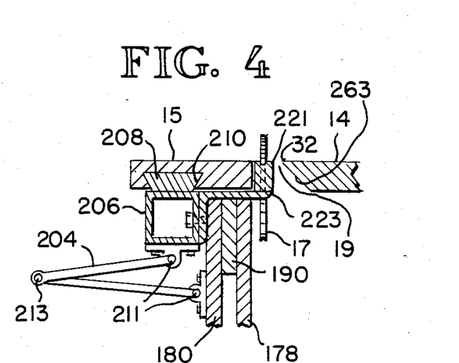
FIG. 4 is a section taken along the line 4—4 in FIG. 1.

Handle 18 further includes a T-shaped hand grip 217 which houses an actuator button 219. This is connected electrically to an appropriate control circuit for operating the motor 176. Additionally, handle 18 includes a movable cut guide indicator 221 which is located in front of blade 17 in lengthwise alignment. Preferably, indicator 221 is made up of an elongated block of a width slightly less than that of slot 19 and is supported by an L-bracket 223 from member 206, as shown (FIG. 4). Lines indicating the blade kerf are inscribed on the upper face of this block in alignment with blade 17. Thus, when moving blade 17 to effect a cut, indicator 221 provides the operator with a line reference with which to guage the cut to be made.

Figure 5:
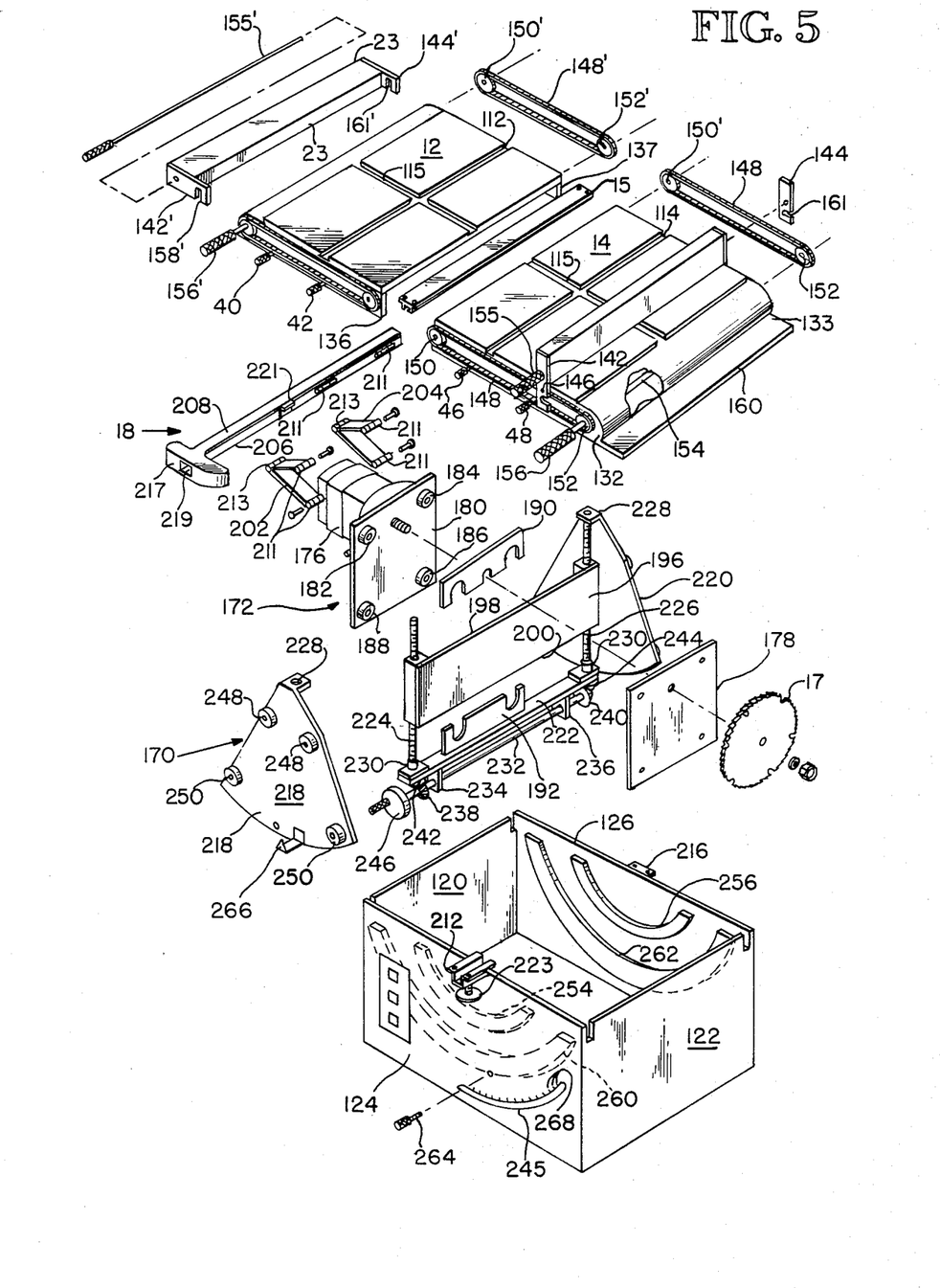
FIG. 5 is an assembly view of the FIG. 1 system.

Still referring to FIGS. 5–7, cradle 170 includes two spaced apart, opposed end cradles 218 and 220 which are interconnected by a lower bolster member 222. Two parallel jackscrews 224 and 226 are supported rotatively at their upper ends by respective journal blocks 228 mounted from the upper ends of end cradles 218, 220, and are supported rotatively at their lower ends by similar journal blocks 230 mounted by member 222, as shown (FIGS. 5 and 6). Jackscrews 224 and 226 are threaded through the ends of rail 196. An operator shaft 232 is supported rotatively by two journal blocks 234 and 236 in underlying parallel relation to member 222, and mounts two bevel gears 238 and 240. These respectively mesh with bevel gears 242 and 244 which are mounted, respectively, by the lower ends of jackscrews 224 and 226. The front end of shaft 232 projects through an arcuate slot 245 in wall 124. An operator handle 246 is secured to the front end of shaft 232 for rotating shaft 232 bidirectionally. When this occurs, the jackscrews are rotated in unison and in such directions as to cause the rail 196 to be moved up or down, depending upon the direction of rotation of handle 246. As a consequence, blade 17 may be raised or lowered in order to control the depth of cut. Connectors 202 and 204, of course, simply extend or contract by pivoting about hinges 213 as this takes place, thereby continuously maintaining a positive connection between the handle and carriage.

The outboard face of each of the end cradles 218 and 220 rotatively supports two pairs of rollers, a pair of upper rollers 248 and a pair of lower rollers 250. As most clearly illustrated in FIGS. 5 and 7, both pairs of upper rollers 248 ride upon and are supported, respectively, by the upper surfaces 252 of two parallel arcuate guide tracks 254 and 256. Both pairs of lower rollers, however, ride along the lower surfaces 258 of two parallel arcuate guide tracks 260 and 262. As a consequence, rollers 248 and 250 and tracks 254, 256, 260 and 262 act to support the cradle 170 so that it may swing laterally. As will now be appreciated, this will result in blade 17 being tilted with respect to the table top as depicted in phantom lines FIG. 7. An inclined relief surface 263 is formed beneath edge 30 in order to provide clearance for blade 17 as it is tilted. Hinged connectors 202 and 204 also maintain a positive connection between the handle and carriage as such tilting occurs simply by pivoting about hinges 211 and 213.

Referring in particular to FIG. 7, the center of curvature of tracks 254, 256, 260 and 262 and hence the center of curvature about which the blade 17 is tiltable is selected so that the pivot point of the saw blade intersects the upper surface of the table top. As a consequence, the blade 17 may be maintained at constant clearance with respect to edge 30, despite its angle of tilt. Additionally, the depth of the cut obtained will remain constant, regardless of blade angle. As will now be appreciated, blade 17 may be raised or lowered at any tilt position, either perpendicular or inclined to the surface of table top 10, depending upon the thickness of the work piece. This offers the further advantage of enabling the system to make angle cuts through work pieces simply by raising the blade an amount sufficient to offset the increased depth of cut required in relation to the angle of tilt and the thickness of the work piece. The system therefore possesses the capacity to make either perpendicular or angle cuts in work pieces of varying thicknesses.

To position and secure the cradle 170 and hence blade 17 at a selected angle of tilt, handle 246 is moved laterally along an arcuate slot 245 formed in wall 124 until blade 17 assumes the angular position desired. At this point, a friction lock 264 may be screwed against the outboard face of end cradle 218 to secure cradle 170 and hence blade 17 at that angular position. Lock 264 is identical to locks 40, 42, 46 and 48, except that it is threaded through wall 124. A tilt indicator 266 projects from the outboard face of end cradle 218 through slot 245 to provide an angle indication with respect to angle markings 268 (FIG. 5) inscribed on wall 124 adjacent slot 245.

THE WORK PIECE CLAMP

Figure 11:
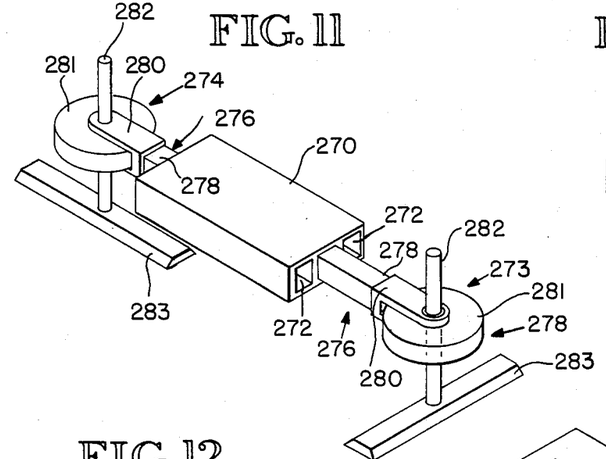
FIG. 11 is a perspective view of the work piece clamp according to this invention.
Figure 12:
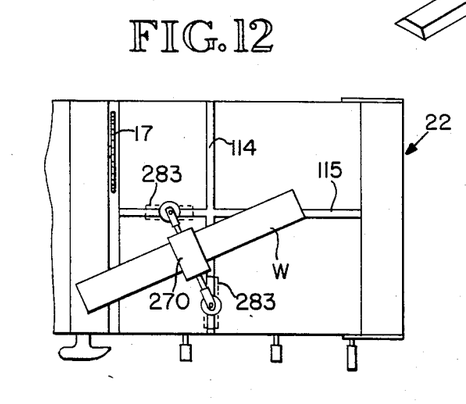
FIG. 12 is a top plan view of the table top of the FIG. 1 system, depicting the FIG. 11 clamp in position to secure an elongated work piece.

Referring to FIGS. 11 and 12, the work piece clamp of this invention may be used to secure a work piece to the table top at any selected angle with respect to blade 17. As most clearly shown in FIG. 11, the clamp includes a clamping member 270 having three open-ended channels 272 of square cross-sectional outlines. Two attachment assemblies 273 and 274 are provided to clamp member 270 downwardly against an underlying work piece resting on the table top. Each of the assemblies 273 and 274 includes a clevis member 276 having an elongated body portion 278 with an outline that registers with the outlines of channels 272. Portions 278 are insertable into opposite ends of one of the channels 272, as shown (FIG. 11). The clevis portion 280 of each of the assemblies 273 and 274 is threaded to a jackscrew 282 which is rotatable by a thumb wheel 281. A key 283 identical to keys 116 and 118 is secured to the lower end of each jackscrew 282.

Referring to FIG. 12, keys 283 are insertable into and movable along grooves 112, 114 or 115 so as to position assemblies 273 and 274 adjacent opposite sides of work piece W, with member 270 overlying the work piece in generally transverse relation therewith. Portions 278 may be extended or contracted within one of the channels 272 to accommodate variations in spacing between assemblies 273 and 274, as determined by the locations of keys 283. At this time, jackscrews 282 are rotated by wheels 281 so as to pull upwardly on keys 283. This causes the keys to grip the overhanging edges of their associated grooves so as to pull member 270 downwardly against the work piece W. Thus, the work piece W may be clamped and secured to the table top. As will be appreciated, work pieces of varying widths may be positioned and secured at selected angles with respect to blade 17 simply by adjusting the relative locations of keys 283 in order to position member 270 in the manner described and shown.

THE ANGLE GUIDE

Figure 13:
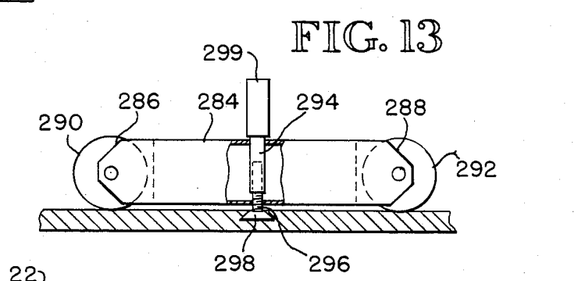
FIG. 13 is a side elevational view, partly in section, of the angle guide according to this invention.
Figure 14:
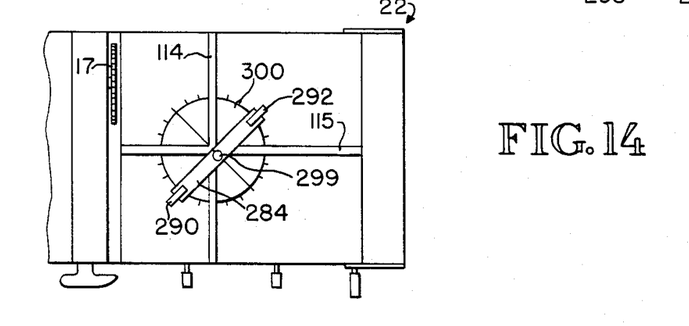
FIG. 14 is a top plan view generally similar to FIG. 12, depicting the FIG. 13 guide in position to align a work piece.

Referring to FIGS. 13 and 14, the angle guide of this invention may be positioned at various locations on the table top to align a work piece at a predetermined angle with respect to blade 17. The angle guide is made up of an elongated member 284 having two clevis end portions 286 and 288 which respectively support two eccentrically mounted thumb wheels 290 and 292, the edges of which progressively engage the surface of the table top as they are rotated. A tubular member 294 extends through the center of member 284 and is threaded internally at its lower end portion to a threaded shaft 296 which projects upwardly from a key 298 identical to keys 116 and 118. A handle portion 299 is formed at the upper end of member 294. A compass rose 300 is inscribed on the top surface of the table top preferably at the intersection of two grooves 114 and 115, as shown (FIG. 14).

Key 298 is insertable into and movable along grooves 112, 114 or 115 so as to position member 284 in overlying relation to compass rose 300. Member 284 then may be rotated about member 294 until it overlies the angle scribe corresponding to the angle at which the work piece is to be inclined with respect to blade 17. Next, handle 299 is turned so as to tighten down upon shaft 296 sufficiently to secure member 284 in that angular position, but allowing key 298 to slide within the grooves. The guide now may be used as a conventional sliding angle guide, or as a fixed guide. As a fixed guide, the guide is moved along one of the grooves to the desired position, and then is secured in that position by rotating wheels 290 and 292 until their edges engage the table top with sufficient force to cause member 284 to be lifted sufficiently so that key 298 is brought into gripping engagement with the groove.

THE KERF GUIDE

Figure 15:
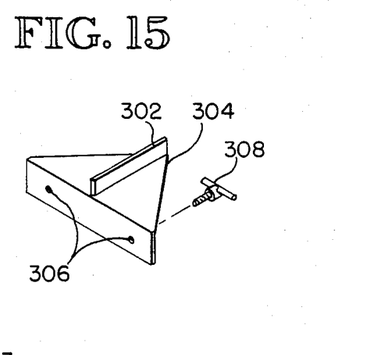
FIG. 15 is a perspective view of the kerf guide according to this invention.
Figure 16:
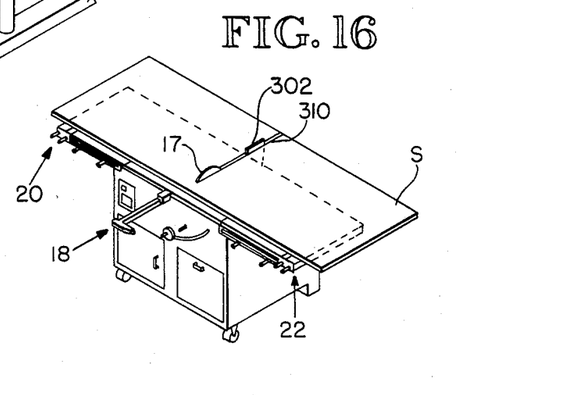
FIG. 16 is a perspective view of the FIG. 1 system, depicting the FIG. 15 kerf guide in position to guide a sheet-like work piece.

Referring to FIGS. 15 and 16, the kerf guide of this invention may be used to guide work pieces, such as plywood sheets S, which are too large to fit between the rip fence assemblies. The kerf guide includes an elongated fin 302 which is upstanding from an L bracket 304. The fin has a kerf or thickness slightly thinner than the kerf of blade 17. In the example, this bracket 304 is triangular in plan view and includes two spaced mounting holes 306. Two mounting bolts 308 (one not shown) are insertable through holes 306 into threaded mounting holes (not shown) formed in wall 126. These mounting holes are so located that the bracket may be secured to wall 126 by bolts 308 so that fin 302 will be adjacent to the rear end of slot 19 in coplanar alignment with blade 17, when blade 17 is positioned at its fully upright or perpendicular position, as shown (FIG. 16).

As depicted in FIG. 16, after an initial cut 310 is made in sheet S, blade 17 is secured at its rear position and both rip fence members are moved to their lower positions. Blade 17 now acts as a stationary cutting blade as sheet S is placed upon table top and moved rearwardly into contact with blade 17. As sheet S is advanced rearwardly, the cut 310 is engaged with fin 302, which acts as a double rip fence to guide sheet S as cut 310 is completed.

While one presently preferred embodiment of this invention has been illustrated and described herein, variations will become apparent to one of ordinary skill in the art. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. A woodworking system for performing multiple woodworking functions, comprising: a base; a saw assembly including a rotary saw blade supported by said base to provide a woodcutting function; a table top supported by said base, said table top including at least one section that is movable to and from an operative position in which one edge thereof fronts upon one side of said rotary saw blade; and a conversion assembly positionable in a space formed between said rotary saw blade and said one edge when said one section is moved from its operative position, and comprising;
   (a) a panel supportable by said base in said space, and securable to said base,
   (b) drive means supported by said panel, and
   (c) means operatively connected with said drive means providing another woodworking function, whereby a work piece may be subjected to another woodworking function.

2. The system of claim 1, wherein said table top includes a fixed section adjacent said rotary saw blade, and wherein said one section, said fixed section and said panel are in coplanar alignment when said panel is located in said space, and wherein said fixed section and said one section include means for positioning said panel with respect to said rotary saw blade, said one section further including means for locking said one section to said base after it has been moved toward its operative first position and into contact with said panel in order to secure said panel.

3. The system of claim 1, wherein said table top includes a second section that is movable to and from an operative position in which one edge thereof fronts upon the other side of said rotary saw blade, and a second such conversion assembly positionable in a second space formed between said rotary saw blade and the one edge of said second section when said second section is moved from its operative position.

4. The system of claim 3, wherein said table top includes a fixed section adjacent said rotary saw blade, and wherein said second section, said fixed section and the panel of said second conversion assembly are in coplanar alignment when the panel of said second conversion assembly is located in said second space, and wherein said fixed section and said second section include means for positioning said panel with respect to said rotary saw blade, said second section further including means for locking said second section to said base after it has been moved toward its operative position and into contact with the panel of said second conversion assembly in order to secure the panel of said second conversion assembly.

5. The system of claims 1 or 3, wherein said saw assembly includes carriage means for supporting said rotary saw blade such that it may be moved reciprocatively along a rectilinear path relative to said table top to effect a cut in a work piece, actuator means operatively connected with said carriage means for moving said carriage means so as to move said rotary saw blade along said path, and means for locking said carriage means at a selected location along said path.

6. The system of claim 5, wherein said saw assembly further includes means supported by said carriage means providing a cutting guide adjacent said rotary saw blade.

7. The system of claim 5, wherein said saw assembly further includes cradle means for supporting said carraige means such that said rotary saw blade may be tilted with respect to said table top, and means for locking said cradle means at a selected angle of tilt.

8. The system of claim 7, wherein said saw assembly further includes means acting between said carriage means and said cradle means for raising and lowering said rotary saw blade with respect to said table top.

9. The system of claim 3, including two rip fence assemblies respectively supported by said one section and said second section, each rip fence assembly comprising;
   an elongated fence member,
   two arms respectively secured to the ends of said fence member,
   two opposed endless positioning chains mounted by opposite edges of the associated section and so connected to corresponding ends of said arms that said fence member is in parallel alignment with said rotary saw blade, and
   operator means operatively associated with said positioning chains for rotating said positioning chains in unison so as to move said fence member toward and away from said rotary saw blade while maintaining it in parallel alignment with said rotary saw blade.

10. The system of claim 9, wherein said arms are connected pivotally to their respectively associated positioning chains, and are movable between an upright position in which said fence member is generally perpendicular to said table top and a lowered position in which said fence member is flush with the associated section to form an extension thereof.

11. The system of claim 9, wherein each rip fence assembly further includes means acting between said arms for urging them together so as to clamp the edges of the associated section therebetween in order to secure said fence member in a selected position with respect to said rotary saw blade.

12. The system of claim 1, including a rip fence assembly supported by said table top, said rip fence assembly comprising;
an elongated fence member,
two arms respectively secured to the ends of said fence member,
two opposed endless positioning chains mounted by opposite edges of said table top and so connected to corresponding ends of said arms that said fence member is in parallel alignment with said rotary saw blade, and
operator means operatively associated with said positioning chains for rotating said positioning chains in unison so as to move said fence member toward and away from said rotary saw blade while maintaining it in parallel alignment with said rotary saw blade.

13. The system of claim 12, wherein said arms are connected pivotally to their respective associated positioning chains, and are movable between an upright position in which said fence member is generally perpendicular to said one section and a lowered position in which said fence member is flush with said table top to form an extension thereof.

14. The system of claim 12, wherein each rip fence assembly further includes means acting between said arms for urging them together so as to clamp the edges of said table top therebetween in order to secure said fence member in a selected position with respect to said rotary saw blade.

15. The system of claim 1, wherein said rotary saw blade is movable with respect to said table top to effect a cut, and further including a clamping member for securing a work piece to said table top while said rotary saw blade is moved through said work piece to effect a cut, said clamping assembly comprising;
variable length clamping means adapted to overlie said work piece in generally perpendicular relation therewith, and
means attachable to said table top for pulling the ends of said clamping means toward said table top at spaced apart locations adjacent opposite sides of said work piece so as to clamp said work piece to said table top.

16. The system of claim 15, wherein said table top includes at least one undercut groove, and wherein said attachable means include two correspondingly shaped keys insertable into said grooves, and two screw means respectively acting between said keys and the ends of said clamping means for selectively pulling said ends toward said table top.

17. The system of claim 16, wherein said clamping means are made up of an elongated member having parallel tubular channels, and two elongated members respectively connected to said screw means, and insertable into opposite ends of said channels.

18. The system of claim 1, wherein said table top includes at least one undercut groove and means forming a compass rose adjacent said groove, and further including an angle guide for positioning a work piece with respect to said rotary saw blade, said angle guide comprising;
a corresponding shaped key insertable into said groove, an elongated guide member, and
screw means acting between said key and said guide member for securing said guide member at a selected angle established by said compass rose, and for pulling said guide member toward said table top to secure said guide member to said table top.

19. The system of claim 1, further including a kerf guide for guiding a sheet-like work piece as it is moved past said rotary saw blade to effect a cut, said kerf guide comprising;
a flat member having a thickness slightly thinner than the kerf of said rotary saw blade, and
means attachable to said table top for supporting said flat member in coplanar alignment with said rotary saw blade.

20. The system of claim 1, wherein said saw assembly further includes:
a motor having a drive shaft connected directly to said rotary saw blade;
a carriage assembly supporting said motor, and including two opposed mounting plates supporting an upper pair of spaced apart support rollers and a lower pair of spaced apart support rollers therebetween;
a cradle assembly including a single guide member extending between said mounting plates with said upper pair of rollers riding along its upper edge and said lower pair of rollers riding along its lower edge to guide said carriage assembly for reciprocative linear movement, two opposed cradle members rigidly connected together by a bolster member, screw means supported by said bolster member and said cradle members, and threadably connected to the ends of said guide member for raising and lowering said guide member;
means mounted by said base supporting said cradle members for reciprocative swinging movement about a center of rotation coinciding with the top surface of said table top;
operator means supported by said bolster member, and operatively connected with said screw means for turning said screw means so as to raise and lower said guide member in order to position said rotary saw blade at a selected height with respect to said table top, and for swinging said cradle members in order to position said rotary saw blade at a selected angle of tilt; and
means acting between said base and at least one of said cradle members for locking said cradle members at a selected angle of tilt;
whereby said rotary saw blade may be moved reciprocatively along a rectilinear path while positioned at a selected angle and a selected height with respect to said table top.

21. The saw assembly of claim 20, further comprising a handle member supported by said table top for reciprocative linear movement parallel to said rectilinear path, and hinged connector means connecting said handle member with one of said mounting plates.

22. The saw assembly of claim 21, further comprising an elongated cutting guide mounted by said handle member adjacent said rotary saw blade in parallel alignment therewith.

23. The system of claims 9 to 12, wherein each of said arms includes:
an opening engageable with said operator means and so located with respect to the connection with its associated positioning chain that the arm will swing about said operator means from an upright position to a generally horizontal position when said opening engages said operator means as said fence member is moved away from said rotary saw blade.

24. The rip fence assembly of claim 23, wherein the lower ends of said arms overlap the edges of said table top, and further including lock means extending between said arms for urging them together and into engagement with the edges of said table top, respectively, so as to lock said fence member in a selected position.

25. The system in claim 9, wherein said table top includes undercut groove means formed therein, and further including a lathe attachment comprising:
a headstock mountable by one said rip fence assembly;
a tailstock mountable by the other said rip fence assembly;
means for respectively locking said headstock and said tailstock to both said rip fence assemblies; and
means attachable within said groove means for supporting a lathe tool intermediate said headstock and said tailstock.

26. A woodworking system comprising:
a base;
a saw assembly including a rotary saw blade supported by said base; and
a sectional table top supported by said base, said table top including:
(a) a section having one edge that fronts upon one side of said rotary saw blade;
(b) means operatively associated with said section for guiding said section for bidirectional movement along a path generally perpendicular to the one side of said rotary saw blade; and
(c) means acting between said section and said base for locking said section to said base at a selected position along said path.

27. The system of claim 26, further comprising a rip fence assembly supported by and movable with said section, said rip fence assembly comprising:
an elongated fence member;
two arms respectively secured to the ends of said fence member;
two opposed endless positioning chains mounted by opposite edges of said section and so connected to corresponding ends of said arms that said fence member is in parallel alignment with said rotary saw blade;
operator means operatively associated with said positioning chains for rotating said positioning chains in unison so as to move said fence member toward and away from said rotary saw blade while maintaining it in parallel alignment with said rotary saw blade; and
wherein said arms are connected pivotally to their respective associated positioning chains, and are movable between an upright position in which said fence member is generally perpendicular to said section and a lowered position in which said fence member is flush with said section to form an extension thereof.

28. The system of claim 26, wherein said table top further includes:
a second section having one edge that fronts the other side of said rotary saw blade;
means operatively associated with said second section guiding said second section for bidirectional movement along a second path generally perpendicular to the other side of said rotary saw blade; and
means acting between said second section and said base for locking said second section to said base at a selected position along said second path.

29. The system of claim 28, further comprising a second rip fence assembly supported by and movable with said second section, said second rip fence assembly comprising:
an elongated fence member;
two arms respectively secured to the ends of said fence member;
two opposed endless positioning chains mounted by opposite edges of said second section and so connnected to corresponding ends of said arms that said fence member is in parallel alignment with said rotary saw blade;
operator means operatively associated with said positioning chains for rotating said positioning chains in unison so as to move said fence member toward and away from said rotary saw blade while maintaining it in parallel alignment with said rotary saw blade; and
wherein said arms are connected pivotally to their respective associated positioning chains, and are movable between an upright position in which said fence member is generally perpendicular to said section and a lowered position in which said fence member is flush with said second section to form an extension thereof.

30. The system of claim 28, wherein said table top further includes a fixed section mounted by said base at a location intervening between the other side of said rotary saw blade and the one edge of said second section.

* * * * *